INVENTOR.
LEONARD R. KAHN
BY Mathis & Graybeal

July 25, 1967 L. R. KAHN 3,333,052

COMMUNICATIONS ENCODING AND DECODING SYSTEM EMPLOYING SELECTIVE ATTENUATION AND PHASE SHIFTING OF SYNCHRONIZING SIGNALS AND HARMONICS

Filed Oct. 18, 1963

3 Sheets-Sheet 2

INVENTOR.
LEONARD R. KAHN
BY Mathis & Graybeal

INVENTOR.
LEONARD R. KAHN
BY
Mathis & Graybeal

United States Patent Office 3,333,052

Patented July 25, 1967

3,333,052

COMMUNICATIONS ENCODING AND DECODING SYSTEM EMPLOYING SELECTIVE ATTENUATION AND PHASE SHIFTING OF SYNCHRONIZING SIGNALS AND HARMONICS

Leonard R. Kahn, 81 S. Bergen Place, Freeport, N.Y. 11520

Filed Oct. 18, 1963, Ser. No. 317,172

39 Claims. (Cl. 178—5.1)

This invention relates to a communications encoding and decoding system wherein frequency spectrum degradation is effected by variously shifting in phase and variously attenuating selected frequency components of a video signal. Although any desired portion or portions of the video signal frequency spectrum can be selected for encoding and decoding, a television video signal can, for example, be encoded by variously attenuating and shifting the phase of certain selected frequency components of the signal, such as the first several harmonics of a recurrent synchronizing (sync) pulse portion of the video signal, preferably the horizontal sync pulse thereof.

One advantage of a subscription communications system according to the present invention is that the system is quite simple and inexpensive, particularly from the point of view of the decoding equipment necessary at the television receiver, the system nevertheless affording a high degree of encoding security. Further, the encoded video signal provided by the invention does not require any subcarrier or separate signal channel, or add other complexity to the transmitted signal, so is well adapted for use as a so-called "wireless" system, as distinguished from many subscription television encoding systems requiring additional bandwidth or requiring "wire" type transmission of the video signal and/or associated encoding type components.

According to a typical form of the invention, the harmonics of a sync pulse of the television video signal are encoded by selective frequency spectrum degradation, specifically by introducing relatively different phase delays and relatively different attenuations to various harmonic components of the pulse frequency spectrum, i.e., by shifting the phase and changing to amplitude of selected components thereof by different amounts. By this technique, selected frequencies of the video signal are smeared and the functioning of the sync pulse can be sufficiently destroyed (i.e. the video television signal can be sufficiently encoded) so that without decoding there is no effective synchronization in the television receiver. As a specific example of practice of the invention, a selected few (say three or four) frequency bands corresponding to the harmonic components of the sync pulse frequency spectrum may be shifted completely (180°) in phase and the original amplitude of the components are retained. or essentially so, and the resulting sync pulse is sufficiently reduced in level so as to not function in the television receiver.

The encoding and decoding techniques of the present invention can be applied to all or only certain portions or bands of the video signal frequency spectrum, such as to frequency bands of the video signal which include the harmonic components of either the horizontal sync pulse or the vertical sync pulse of the television video signal. In this respect, it is preferable to select a frequency spectrum degradation pattern which at least in part encodes the horizontal sync pulse in that loss of horizontal synchronization in a television video signal produces more raster distortion and consequently better encoding than does loss of vertical synchronization. For this reason, the following discussions of certain typical embodiments of the invention are directed to television video signal encoding and decoding by degradation and restoration of various frequency bands corresponding to the harmonic frequencies of the horizontal sync pulse of the video signal. It is to be understood, however, that the frequency spectrum degradation pattern, i.e. the frequency bands of the video signal in which frequency degradation is made to occur, can involve any desired portion or portions, or even the whole, of the video signal frequency spectrum.

The horizontal sync pulse of a television video signal is a short pulse having a duty factor of .08, recurring every 63.5 microseconds, i.e. at a pulse repetition frequency of 15.75 kilocycles (kc. s.). If the horizontal sync pulse is analyzed it is seen that, as is true of all short pulses, it follows a spectrum shown by Fourier analysis to be $$\frac{\sin x}{x}$$

etc. The first harmonic component is direct current (DC) equal to .08 times the peak value of the pulse, and since the function $$\frac{\sin x}{x}$$

is a slow moving function with small values of $x$ the first order harmonic component at 15.75 kc. s. and the second order harmonic component at 31.5 kc. s. are near the .08 amplitude level.

Federal Communications Commission standards require the sync signal of a television video signal be in the so-called "black-black" region and the sync pulse accounts for the top 25% of the peak amplitude of the video signal. The functioning of a sync signal can be destroyed by dropping the sync pulse height so that it is into the video or "white" level rather than the sync of "black-black" level.

To illustrate various techniques for achieving encoding and decoding of the television video signal by variously phase shifting the frequency components of the horizontal sync pulse, the accompanying illustrations diagrammatically or schematically present various circuit arrangements typical of the invention, as follows.

Figure 1:
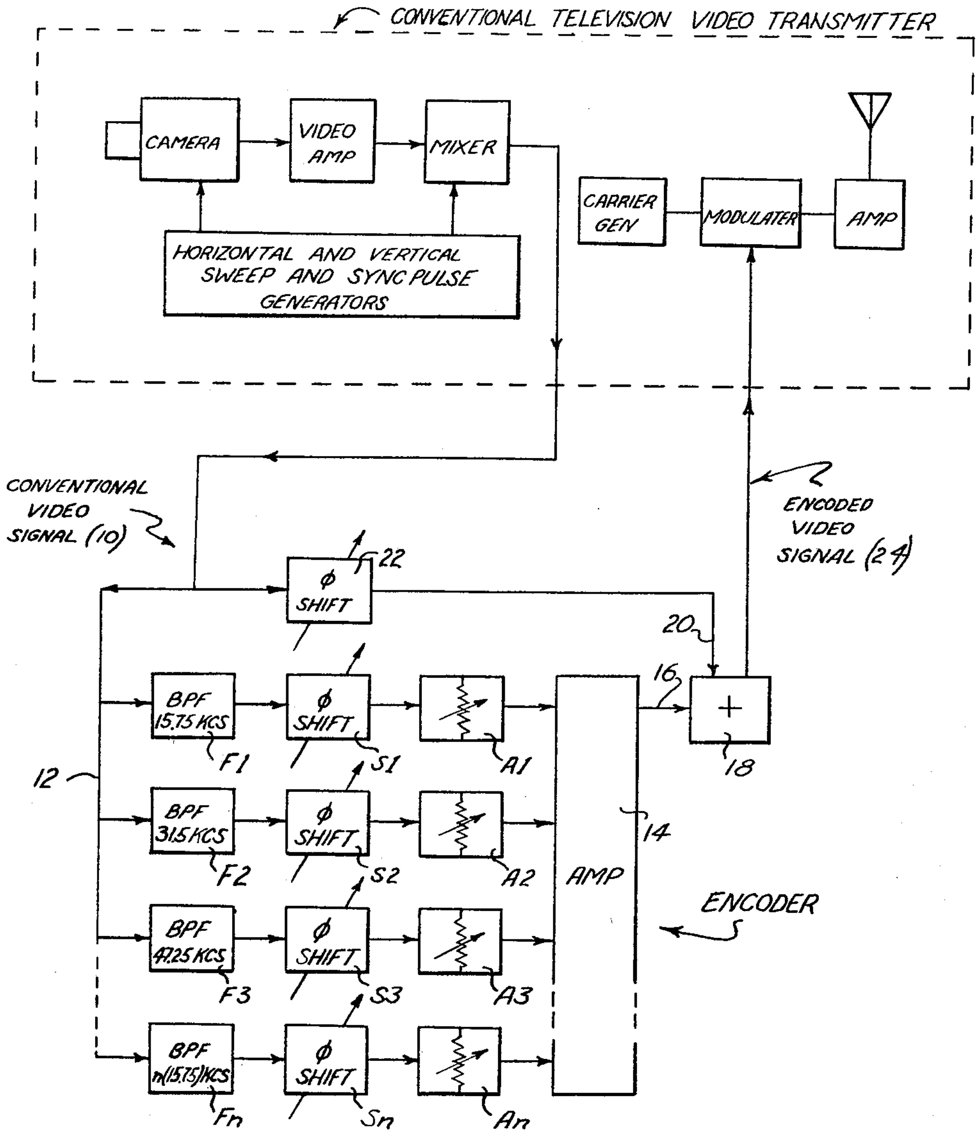
FIG. 1 is a block diagram of a sync pulse encoder typifying the invention, as used in connection with an otherwise conventional television video transmitter.

In the encoder shown in FIG. 1, the encoder receives as an input 10 from the conventional transmitter a conventional video signal, including unencoded sync pulses. As will be understood, this video signal is of a type conforming to FCC standards, as used to develop a visual image by a succession of horizontal line scans and a succession of vertical field scans with a horizontal sync pulse recurring during line retrace intervals and a vertical sync pulse recurring during field retrace intervals.

A sample or portion 12 of the video signal input 10 to the encoder is fed to a parallel array of bandpass filters F1, F2, F3, F$n$, each passing only one harmonic frequency component of the horizontal synchronization pulse; for example the bandpass filter F1 is centered on 15.75 kc. s., the second bandpass filter F2 is centered on 31.5 kc. s., the third bandpass filter F3 is centered on 47.25 kc. s. and so on progressively to the highest frequency bandpass filter F1, centered on a frequency of $n$ (15.75) kc. s. In a typical installation, the passband of each of the bandpass filters is about 500 cycles and the array of bandpass filters F1–F$n$ totals at least about four (for effective horizontal sync signal degradation) and not more than about ten (for simplicity).

The respective outputs from the bandpass filters F1–F$n$ are each fed to respective variable phase shift networks, respectively designated S1, S2, S3, S$n$ in FIG. 1. The respective outputs from the phase shift networks S1–S$n$ are in turn fed through respective variable attenuators A1, A2, A3, A$n$, then to combiner-amplifier means 14.

As will be apparent from FIG. 1, bandpass filters F1–F$n$ in effect function to isolate each harmonic frequency component of the horizontal sync signal of video signal input sample 12. Each such isolated frequency component is then subjected to a different and selectively variable phase shift in the respective phase shift networks S1–S$n$, or only a portion of the isolated frequency components can be thus phase shifted, depending upon the selected coding, as more fully explained below. The outputs from the respective phase shift networks S1–S$n$ are then passed to the respective variable attenuators A1–A$n$, which also afford coding variations, as also more fully explained below. The output from the respective attenuators A1–A$n$ are then passed to the combiner-amplifier means 14, wherein they are amplified to the desired level and fed as input 16 to a mixing circuit 18 which also receives as an input a portion or sample 20 of the original video signal input 10, a variable phase shift network 22 being provided to maintain the reference phase of the signal portion 20 being fed to the mixer circuit 18 in proper relation with the reference phase of the input 16 from combiner-amplifier means 14.

As will be apparent, the encoded video signal output 24 contains all of the line trace video information and the vertical sync pulse of the unencoded video signal input 10, plus the vectoral resultant of the various horizontal sync pulse harmonic inputs appearing in the inputs 16 and 20. By proper selection of phase shifting and attenuation, through means of the variable adjustments provided in the respective phase shifters S1–S$n$ and attenuators A1–A$n$, the horizontal sync pulse becomes so degraded as to be inoperative for line scan sync purposes unless suitably further modified in the television receiver. As will be apparent, the various selected settings of the phase shifters and attenuators establish an encoding "code."

Figure 2:
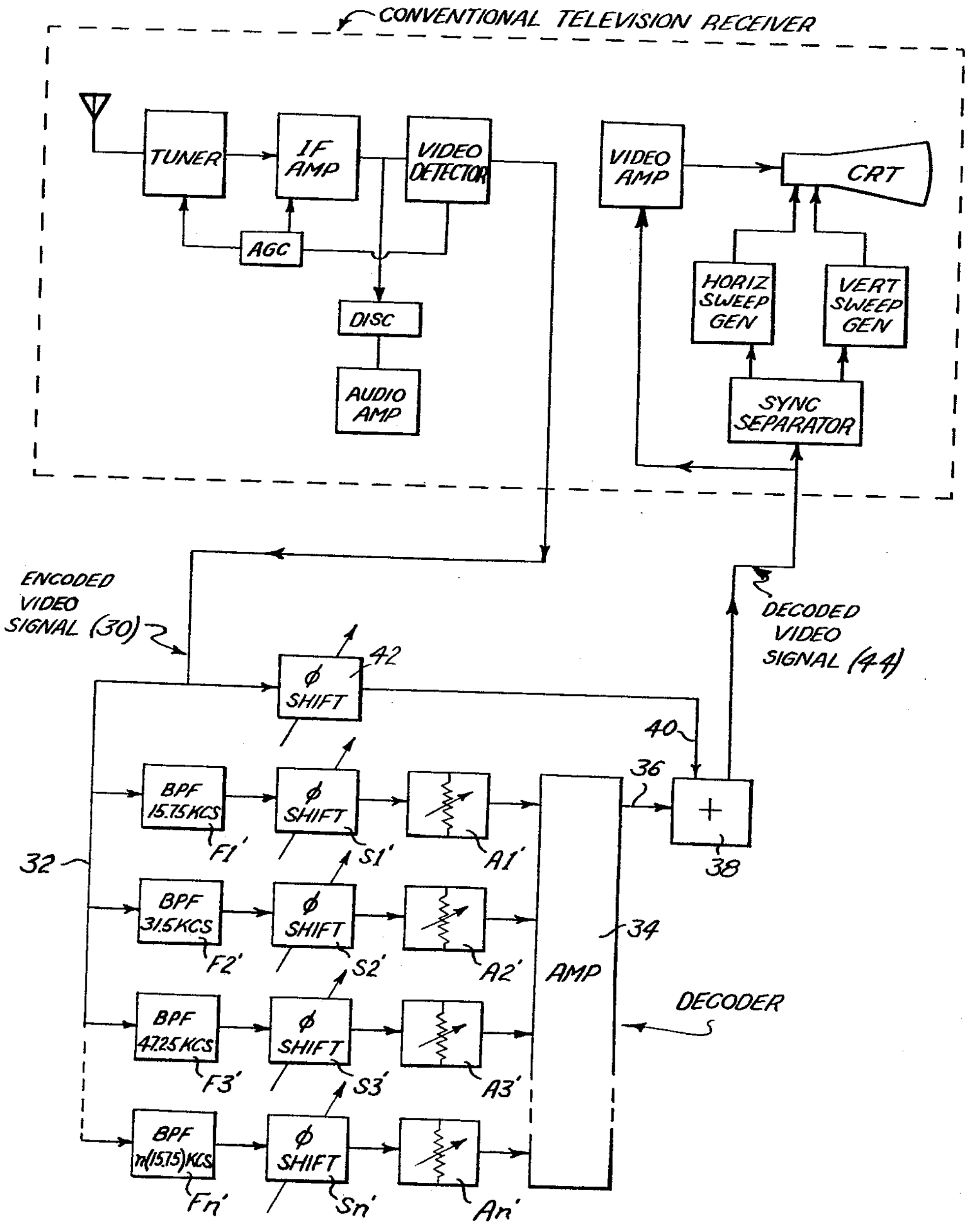
FIG. 2 is a block diagram of a sync pulse decoder typifying the invention and adapted to decode the encoded video signal produced by the encoder shown in FIG. 1, the decoder being shown in connection with an otherwise conventional television receiver.

With reference to reception of the encoded video signal, and as shown in FIG. 2, it will be understood that the television receiver employed is of generally conventional design except for addition thereto of a decoder circuit. The decoder circuit incorporated in or used as an accessory to a subscriber's television receiver functions to restore the harmonic frequency components of the encoded sync pulse to substantially their pre-encoded phase and amplitude relationships (i.e. to essentially its pre-encoded form, cf. signal 10 in FIG. 1), whereupon the video signal with its sync pulse restored is employed in the receiver to effect a synchronized image presentation. As will also be evident, a non-subscribing video receiver, without decoding circuitry or without knowledge of the particular coding circuitry adjustments and/or switching involved (i.e. the particular coding assigned to a particular program) cannot realize a synchronized image presentation, in that without proper decoding the encoded sync pulse is inoperative insofar as providing a synchronized image presentation.

To illustrate a typical decoder circuit usable in connection with the invention, FIG. 2 demonstrates by block diagram the component arrangement for decoding an encoded video signal wherein the encoding involves degradation of a recurrent sync pulse to the extent that certain of the video signal frequencies which include the various frequency components of the recurrent sync pulse have been variously attenuated and shifted in phase. To restore the recurrent sync pulse to operating form, the video detector output 30 of the receiver (fed through a suitable isolation stage, if desired, so that the video detector is not overloaded) is in part delivered as an input 32 to a parallel array of bandpass filters F1′, F2′, F3′, F$n$′, each having a suitable bandwidth (say about 500 cycles) centered on a harmonic component of the horizontal sync pulse, i.e. at respective center frequencies of 15.75 kc. s., 31.5 kc. s., 47.25 kc. s. and so on to $n$ (15.75) kc. s., in like manner as the respective bandpass filters F1–F$n$ of the transmitter encoding circuit. The respectively isolated harmonic frequency components of the encoded video signal are then applied to respective variable phase shifting circuits S1′, S2′, S3′ and S$n$′ and to respective variable attenuators A1′, A2′, A3′, and A$n$′, wherein the respective phase correction and attenuation correction are essentially inverse to the relative phase shift and relative attenuation applied to the harmonic components in the transmitter encoding circuit. The variable adjustments of the phase shifting circuits S1′–S$n$′ and the variable adjustments of the attenuation circuits A1′–A$n$′ collectively provide a wide variety of coding possibilities, sufficient in number so that it is extremely difficult if not impossible for anyone not having knowledge of the particular coding necessary to decode the encoded signal as a matter of trial and error.

From the various attenuating circuits A1′–A$n$′, the phase corrected and attenuation corrected frequency components of the horizontal synchronizing pulse are fed to combiner-amplifier means 34, wherein they are amplified to the desired level and fed as input 36 to a mixing circuit 38 which also receives as an input 40 a part of the encoded video signal 30, a variable phase shift network 42 being provided to maintain the reference phase of the signal portion 40 in proper relation with the reference phase of the input 36 from the combiner-amplifier 34.

The decoded video signal output 44 from the mixer circuit 38 contains all of the information in the encoded video signal input 30 and further includes the various phase corrected and attenuation corrected horizontal sync pulse components developed in the bandpass means, phase shifters and attenuators, with the net result that the horizontal sync pulse harmonic components in the decoded video signal output 44 are in each case a vectoral sum of the harmonic components contributed by the inputs 36 and 40. By proper selection of corrective phase shifting and corrective attenuation, through means of the variable adjustments provided in the respective phase shifters S1′–S$n$′ and attenuators A1′–A$n$′, the frequency components of the horizontal sync pulse are reestablished to substantially their pre-encoded phase and amplitude relationships. As will be apparent, the various proper settings of the phase shifters and attenuators in the receiver decoding circuit to thus restore the horizontal synchronizing pulse of the received video signal establish a decoding "code." As will be also evident, any selected encoding "code" at the transmitter has a corresponding, predeterminable decoding "code" which can be preliminarily communicated to program subscribers.

In the receiver decoding arrangement shown at FIG. 2, the considerable number of circuit components involved would necessarily result in a relatively elaborate decoding device, and be relatively expensive. While expense is not a controlling factor in a transmitter encoding circuit, an unduly expensive receiver decoding circuit is to be avoided since each receiver requires a decoding accessory.

Figure 3:
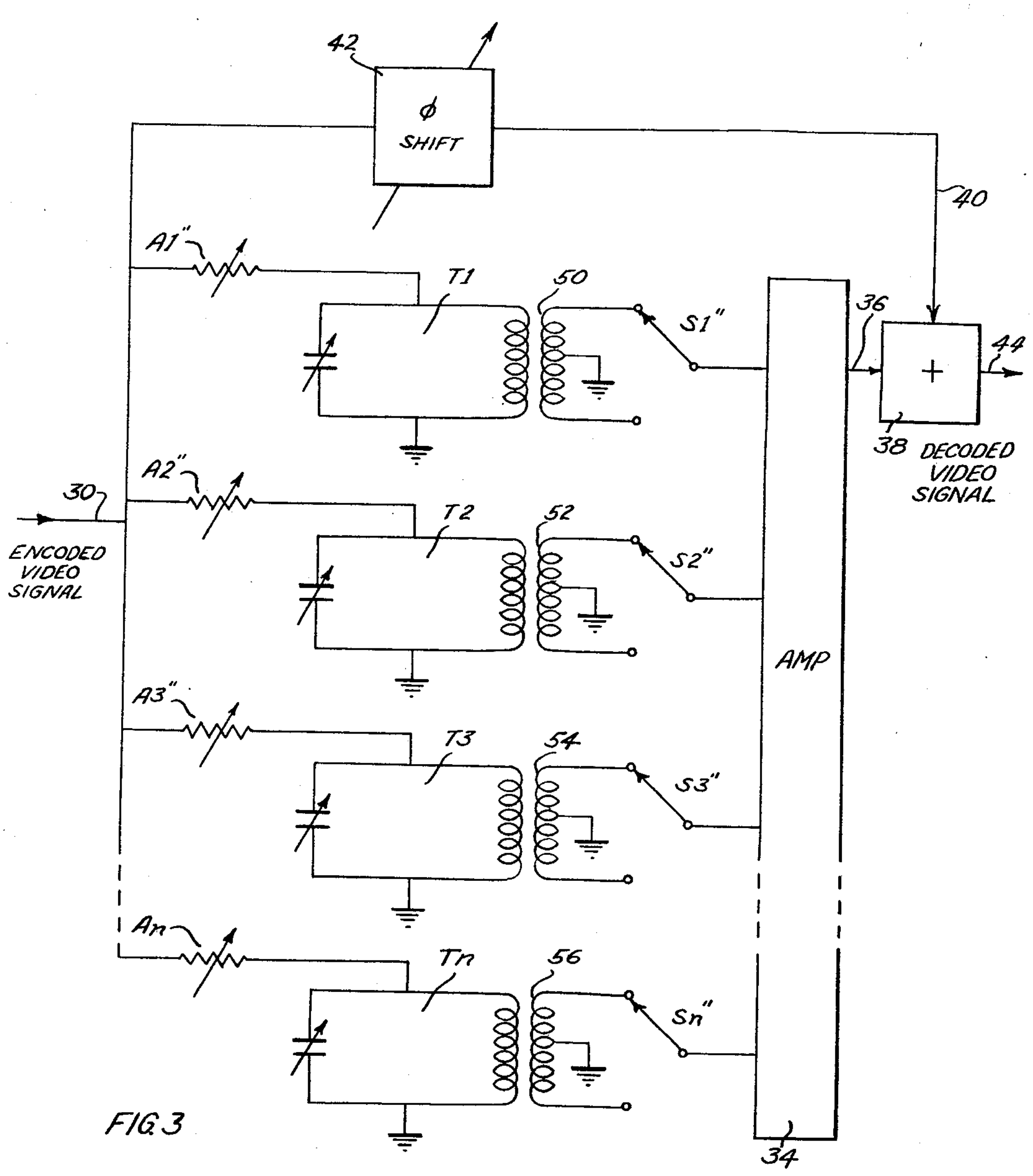
FIG. 3 is a schematic showing of a simplified decoding circuit characteristic of the invention.

Complexity in the decoding circuit can be minimized to a considerable extent. One form of simplified decoding circuitry essentially performing the various bandpass filtering, phase shifting and attenuating functions of the block diagram arrangement shown at FIG. 2 is the circuitry shown at FIG. 3, for example. In FIG. 3, the encoded video signal 30, derived in like manner as in FIG. 2, is in part fed to a parallel array of variable isolation resistors A1″, A2″, A3″, A$n$″, then to respective tuned circuits T1, T2, T3, T$n$, each tuned to a respective harmonic of the horizontal sync pulse, or substantially so.

The exact frequency to which each of the tuned circuits T1, T2, T3, Tn is tuned is variable (as by the variable capacitance shown in each case), and the respective tuned circuits would be either "on" frequency or somewhat "off" frequency in relation to the various frequency harmonics (multiples of 15.75 kc.) making up the frequency spectrum of the horizontal sync pulse. As is known, a slightly off-tuned circuit is a simple form of phase shifting and attenuating network, and variation in tuning of a tuned circuit is one simple way to change the decoding "code" of the decoder.

The variable frequency tuning of the respective tuned circuits T1–Tn can introduce two variable factors. Such tuning can correct harmonic component attenuation (i.e. amplitude) by changing the sensitivity of the tuned circuit (i.e. by operating more or less on the slope of the sensitivity curve of the circuit). Tuning of the tuned circuit can also shift the phase of the harmonic component to a substantial degree, depending upon the extent to which the tuned circuit is off frequency with respect to the frequency of the harmonic component. For a given desired amplitude, there are two choices of phase relation, one choice being an above center tuning of the circuit and the other choice being a below center tuning of the circuit. For a given amount of off frequency tuning, tuning either above or below center frequency can result in the same extent of amplitude attenuation, but different phase shifting will occur, the phase shift being advanced in one case and retarded in the other. A given number of tuned circuits thus provides twice as many coding possibilities as there are tuned circuits, one coding possibility being as to relative attenuation or amplitude and the other coding possibility being as to phase shift at that amplitude.

Thus, the respective tuned circuit tuning involved in setting up a given decoding "code," as assigned to a specified television program, might typically involve tuning of the tuned circuit T1 at 15.75 kc. plus 100 cycles, tuning of the tuned circuit T2 at 31.5 kc. less 500 cycles, tuning of the tuned circuit T3 at a frequency of 47.25 kilocycles exactly, and tuning of the tuned circuit Tn at a frequency of 63 kilocycles plus 300 cycles. With respect to variation in decoding "code" it is also to be noted that the various isolation resistors A1″–An″ are each independently variable and settable at specific selected resistances to provide various respective degrees of attenuation, and thus also contribute to the available decoding "code" variations.

In the circuit shown at FIG. 3, a further coding variable as to phase shift is provided by the various individually shiftable switches S1″, S2″, S3″, Sn″, each of which can be shifted to reverse the phase of the output appearing in the inductively coupled output coil 50, 52, 54, or 56 of the respective tuned circuits T1, T2, T3, Tn. The respective output coils 50, 52, 54, 56, though shown as center tapped, of course need not be center tapped in order to effect the desired reversal in phase. As will be evident, a switching of each of the switches S1″–Sn″ effects a phase reversal of the associated tuned circuit output and provides further variation as to corrective phase shift and decoding "code."

The respective outputs from the phase shifting switches S1″–Sn″ are fed to a combiner-amplifier 34 and the output 36 therefrom is combined in mixer circuit 38 with an input 40 from phase shift circuit 42, producing a decoded video signal output 44, in like manner as in the circuit arrangement shown in FIG. 2.

Each of the decoding circuits above presented basically provides for restoration of the frequency spectrum degradation of the received video signal, with this result being accomplished by sync pulse harmonic component isolation, corrective phase shift, corrective attenuation, and recombining with the encoded video signal to provide a decoded, essentially undistorted video signal for synchronized image presentation in the television receiver.

In more generalized terms, the decoding aspect of the invention involves deriving substantially the initial, unencoded video signal frequency spectrum by corrective phase shifting and corrective attenuation of those frequency bands of the video frequency spectrum which were degraded during the encoding process. Consistent with the underlying concept of the invention, i.e., degradation and restoration of selected frequencies of the video signal spectrum by selective and variable phase shifting and attenuation, it is to be understood that the "selected frequencies" which are thus encoded or decoded can follow an orderly frequency pattern (e.g. harmonics of a sync pulse) or can involve a wide band of frequencies (i.e. a substantial portion of the video signal spectrum such as all frequencies below 200 kc., for example) or can involve even the whole video frequency spectrum, so long as the decoding circuit is such as to essentially restore the phase and amplitude relationships of the various selected frequencies to the initial relationships thereof in the unencoded video signal. Thus, one or more complex low pass or all-pass networks with a multiplicity of component adjustments (ten, for example) can be employed for encoding and decoding, with relatively different delays (i.e. phase shifts) and relatively different attenuation at various frequencies, if desired. Use of a passive network type circuit for decoding purposes makes possible an essentially simple and relatively inexpensive receiver decoding accessory.

The information to the program subscriber as to proper decoding code for a given program can be pre-communicated to the subscriber in any desired manner. One extremely simple way of arranging the decoder so that the subscriber can set his assigned decoding code is to have a series of double throw switches, say ten, on the decoding accessory used with or as part of the television receiver, with each switch being thrown "up" or "down," according to the assigned code sequence. Another way in which the coding information can be transmitted to the program subscriber is to convey such in the form of a punch card or the like which is simply inserted into the decoding accessory and makes appropriate circuits for the assigned decoding combination, as by having printed circuits thereon, or by providing a readout which appropriately closes switch mechanisms within the accessory to establish the correct decoding circuits. To change coding, the simplest circuit changes would of course involve changing resistor values or changing capacitor values. In an encoding and decoding system emphasizing sync pulse degradation, it is also possible to effect encoding or decoding by degrading and restoring frequency bands corresponding to the harmonics of the vertical sync pulse of the video signal, rather than the harmonics of the horizontal sync pulse. However, it is impractical to encode both the horizontal and vertical sync pulses unless tranmitter design is modified, because present television transmitter systems rely on D.C. restoration to maintain the synchronization pulse level constant. When encoding degradation is applied principally to the vertical sync pulse, the same manner of harmonic degradation and harmonic restoration is employed as is applied to the horizontal sync pulse, except that the various frequency components isolated and modified are selected at low order multiples of the field fundamental frequency (60 cycles). Encoding of the vertical sync pulse harmonic frequencies is considered considerably less desirable, however, because loss of vertical sync in a video image presentation simply results in a rolling of the raster up or down and considerably less privacy is afforded than if the horizontal sync pulse of the video signal is ineffective. There is also less privacy when using vertical sync encoding, in that the repetition frequency of the vertical sync pulse is so low that all effective harmonics of the vertical sync pulse are of such relatively low frequency as to not be greatly significant in the video information spectrum.

The bandpass filters, tuned circuits, or other frequency component isolation circuitry employed, both in the transmitter and the receiver, cannot be too narrow because if the Q is too high the circuitry cost is increased and the sensitivity to tuning error is increased. An extremely high Q circuit, such as with a Q of 200, is susceptible to off-tuning even by a slight error in or change in capacitance. Further, a very high Q can give rise to a field problem in that such variables as temperature and component aging can result in change of Q and undesired off-tuning. On the other hand, the frequency component actuation circuitry must have a reasonable amount of selectivity in order to provide sufficient phase shift and amplitude variation. In general a circuit Q of from about 5 to about 50 is considered practical, with a Q of about 10 being preferred.

As to the extent of degradation of the original sync pulse desirable to render the sync pulse inoperative, it is considered that about eight to ten db will provide sufficient pulse degradation. As to the extent of pulse restoration, the restoration should reconstitute the pulse to within about one db of the original pulse level.

From the foregoing, various further modifications, arrangements, adaptations, and modes of utilization of the invention will be apparent, within the scope of the following claims.

What is claimed is:

1. The method of encoding a video signal of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal which include frequency components of a recurrent synchronizing pulse of the unencoded video signal; variously shifting the phases of and attenuating the amplitudes of the said isolated harmonic frequency components; adding the resulting variously phase shifted and attenuated harmonic frequency components to the unencoded video signal to degrade the synchronizing pulse portion thereof and thereby provide the encoded video signal; and transmitting the encoded video signal.

2. The method of encoding a video signal of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal including frequency components of the horizontal synchronizing pulse portion of the unencoded video signal; variously shifting the phases of and attenuating the amplitudes of the said isolated harmonic frequency components; adding the resulting variously phase shifted and attenuated harmonic frequency components to the unencoded video signal to degrade the horizontal synchronizing pulse portion thereof and thereby provide the encoded video signal; and transmitting the encoded video signal.

3. The method of claim 2, wherein from about three to about ten harmonic frequencies of the video signal are phase shifted and attenuated.

4. The method of encoding and decoding a video signal communications system of the type for presenting a line scan type visual image, said method comprising: generating an unencoded video signal with included synchronizing pulses; variously shifting the phases of and attenuating the amplitudes of selected frequency components of the unencoded video signal, including frequency components of such synchronizing pulses, by relatively different amounts; adding the resulting variously phase shifted and attenuated frequency components to the unencoded video signal to provide an encoded video signal; amplitude modulating a carrier wave with the encoded video signal; radiating the modulated carrier wave; receiving said encoded video signal modulated carrier wave; detecting the encoded video signal; decoding the encoded video signal by restoring said frequency components thereof to substantially their pre-encoded phase and amplitude relationships; and effecting a synchronized image presentation of the decoded video signal.

5. The method of encoding and decoding a video signal communications system of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal including frequency components of a recurrent synchronizing pulse of the unencoded video signal; variously shifting the phases of and attenuating the amplitudes of the said isolated harmonic frequency components; adding the resulting variously phase shifted and attenuated harmonic frequency components to the unencoded video signal to degrade the synchronizing pulse portion thereof and thereby provide an encoded video signal; amplitude modulating a carrier wave with the encoded video signal; radiating the modulated carrier wave; receiving said encoded video signal modulated carrier wave; detecting the encoded video signal; decoding the encoded video signal by restoring the harmonic frequency components of the said recurrent synchronizing pulse to substantially their pre-encoded phase and amplitude relationships; and effecting a synchronized image presentation of the decoded video signal.

6. The method of encoding and decoding a video signal communications system of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal; selecting certain harmonic frequency components of the unencoded video signal, including frequency components of a synchronizing pulse thereof; variously shifting the phases of and attenuating the amplitudes of the said selected frequency components; adding the resulting variously phase shifted and attenuated frequency components to the unencoded video signal to provide an encoded video signal; amplitude modulating a carrier wave with the encoded video signal; radiating the modulated carrier wave; receiving said encoded video signal modulated carrier wave; detecting the encoded video signal; decoding the encoded video signal by corrective phase shift and attenuation of the said frequency components to restore said frequency components to substantially their pre-encoded phase and amplitude relationships; and effecting a synchronized image presentation of the decoded video signal.

7. The method of claim 6, wherein from about three to about ten harmonic frequencies of the video signal are encoded and decoded.

8. The method of encoding and decoding a video signal communications system of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal including frequency components of the horizontal synchronizing pulse portion thereof; variously shifting the phases of and attenuating the amplitudes of the said isolated harmonic frequency components; adding the resulting variously phase shifted and attenuated harmonic frequency components to the unencoded video signal to degrade the horizontal synchronizing pulse portion thereof and thereby provide an encoded video signal; amplitude modulating a carrier wave with the encoded video signal; radiating the modulated carrier wave; receiving said encoded video signal modulated carrier wave; detecting the encoded video signal; decoding the encoded video signal by restoring the harmonic frequency components of the said horizontal synchronizing pulse to substantially their pre-encoded phase and amplitude relationships; and effecting a synchronized image presentation of the decoded video signal.

9. The method of claim 8, wherein from about three to about ten harmonic frequencies of the video signal are encoded and decoded.

10. In a subscription television video receiver wherein a visual image is presented by a succession of horizontal line scans and a succession of vertical field scans with a horizontal synchronizing pulse recurring during line retrace intervals and a vertical synchroning pulse recurring during field retrace intervals, the method of decoding an encoded video signal characterized by the degradation of a recurrent sync pulse thereof to the extent that certain of the various frequency components of the recurrent sync pulse have been variously attenuated and shifted in phase, said method comprising: detecting the encoded video signal; isolating certain harmonic frequency components of the video signal, including components of the degraded synchronizing pulse thereof; variously phase shifting, attenuating and recombining said harmonic frequency components to substantially restore their pre-encoded phase and amplitude relationships and thereby develop a decoded video signal; and employing the decoded video signal to effect a synchronized video image presentation.

11. In a subscription television video receiver wherein a visual image is presented by a succession of horizontal line scans and successive vertical field scans, the method of decoding an encoded video signal having selected bands of frequencies, including frequency components of a synchronizing pulse of the video signal, which bands are variously attenuated and shifted in phase by different amounts in relation to other signal frequencies, said method comprising: detecting the encoded video signal; selecting and correctively phase shifting and attenuating the selected frequency bands of the detected video signal by sufficient amounts so that when the corrected frequency bands are recombined with the encoded video signal the resultant video signal has essentially all of the frequency components thereof restored to their pre-encoded phase and amplitude relationships; adding the thus phase corrected and amplitude corrected frequency bands to the detected, unencoded video signal to derive a decoded video signal; and using the decoded video signal to effect a synchronized video image presentation.

12. The method of claim 11, wherein from about three to about ten harmonic frequencies of the video signal are phase shifted and attenuated.

13. In a subscription television video receiver wherein a visual image is presented by a succession of horizontal line scans and a succession of vertical field scans with a horizontal synchronizing pulse recurring during line retrace intervals and a vertical synchronizing pulse recurring during field retrace intervals, the method of decoding an encoded video signal characterized by the degradation of a recurrent sync pulse thereof to the extent that certain of the various frequency components of the video signal, including frequency components of a recurrent sync pulse thereof, have been variously attenuated and shifted in phase, said method comprising: detecting and encoded video signal; isolating certain harmonic frequency components of the video signal including frequency components of the degraded sync pulse thereof; deriving phase corrected and amplitude corrected frequency components therefrom by separately phase shifting and attenuating the said isolated harmonic frequency components so that when said components are recombined with the encoded video signal the resultant video signal includes the synchronizing pulse with the frequency components thereof restored substantially to their pre-encoded phase and amplitude relationships; adding the thus phase corrected and amplitude corrected harmonic frequency components to the unencoded video signal to derive a decoded video signal; and using the decoded video signal to effect a synchronized video image presentation.

14. In a subscription television video receiver wherein a visual image is presented by a succession of horizontal line scans and successive vertical field scans with a horizontal synchronizing pulse recurring during line retrace intervals and a vertical synchronizing pulse recurring during field retrace intervals, the method of decoding an encoded video signal characterized by the degradation of certain frequency components of the video signal, including frequency components of the horizontal sync pulse thereof, to the extent that certain of the various frequency components of the recurrent sync pulse have been variously attenuated and shifted in phase, said method comprising: detecting the encoded video signal; isolating certain harmonic frequency components of the video signal including frequency components of the degraded horizontal sync pulse thereof; deriving phase corrected and amplitude corrected frequency components therefrom by separately phase shifting and attenuating the said isolated harmonic frequency components so that when said components are recombined with the encoded video signal the resultant video signal includes the horizontal synchronizing pulse with the frequency components thereof restored substantially to their pre-encoded phase and amplitude relationships; adding the thus phase corrected and amplitude corrected harmonic frequency components to the unencoded video signal to derive a decoded video signal; and employing the decoded video signal to effect a synchronized video image presentation.

15. The method of encoding and decoding a video signal communications system of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal, including frequency components of a recurrent synchronizing pulse of the unencoded video signal; variously shifting the phases of and attenuating the amplitudes of the said isolated harmonic frequency components; adding the resulting variously phase shifted and attenuated harmonic frequency components to the unencoded video signal to degrade the synchronizing pulse portion thereof and thereby provide an encoded video signal; amplitude modulating a carrier wave with the encoded video signal; radiating the modulated carrier wave; receiving said encoded video signal modulated carrier wave; detecting the encoded video signal; decoding the encoded video signal by restoring the harmonic frequency components of the said recurrent synchronizing pulse to substantially their pre-encoded phase and amplitude relationships; and effecting a synchronized image presentation of the decoded video signal.

16. The method of encoding and decoding a video signal communications system of the type for presenting a visual image by a succession of horizontal line scans and successive vertical field scans with a horizontal synchronizing pulse recurring during line retrace intervals and a vertical synchronizing pulse recurring during field retrace intervals, said method comprising: generating an unencoded video signal with included synchronizing pulses; separately isolating several harmonic frequency components of the video signal, including frequency components of the horizontal synchronizing pulse portion of the unencoded video signal; variously shifting the phases of and attenuating the amplitudes of the said isolated harmonic frequency components; adding the resulting variously phase shifted and attenuated harmonic frequency components to the unencoded video signal to degrade the horizontal synchronizing pulse portion thereof and thereby provide an encoded video signal; amplitude modulating a carrier wave with the encoded video signal; radiating the modulated carrier wave, receiving said encoded video signal modulated carrier wave; detecting the encoded video signal; decoding the encoded video signal by restoring the harmonic frequency components of the said horizontal synchronizing pulse to substantially their pre-encoded phase and amplitude relationships; and effecting a synchronized image presentation of the decoded viedo signal.

17. The method of claim 16, wherein from about three to about ten harmonic frequencies of the video signal are phase shifted and attenuated.

18. In a video signal wireless transmission system of the type presenting a line scan type visual image, a video signal encoding means comprising: means for generating an unencoded video signal with included synchronizing pulses; means selecting various harmonic frequency components of the unencoded video signal, including frequency components of a synchronizing pulse thereof; means variously shifting the phases of the said frequency components; means for variously attenuating the amplitudes of the said frequency components; means recombining the resulting variously phase shifted and attenuated frequency components with the unencoded video signal to provide an encoded video signal; means amplitude modulating a carrier wave with the encoded video signal; and means radiating the modulated carrier wave.

19. In a video signal communications system of the type presenting a visual image by a succession of horizontal line scans and a succession of vertical field scans with a horizontal synchronizing pulse recurring during line retrace intervals and a vertical synchronizing pulse recurring during field retrace intervals, a video signal encoding means comprising: means for generating an unencoded video signal with included synchronization pulses; a parallel array of bandpass means separately isolating several harmonic frequency components of the video signal, including frequency components of a recurrent synchronizing pulse of the unencoded video signal; means variously shifting the phases of the said isolated harmonic frequency components; means for variously attenuating the amplitudes of the said isolated harmonic frequency components; and means recombining the resulting variously phase shifted and attenuated harmonic frequency components with the unencoded video signal to degrade the synchronizing pulse portion thereof and thereby provide an encoded video signal.

20. In a video signal communications system of the type presenting a visual image by a succession of horizontal line scans and a succession of vertical field scans with horizontal synchronizing pulses recurring during line retrace intervals and vertical synchronizing pulses recurring during field retrace intervals, video signal encoding circuits comprising: means for generating an unencoded video signal with included horizontal and vertical synchronization pulses; a parallel array of bandpass means separately isolating several harmonic frequency components of the video signal including frequency components of horizontal synchronizing pulse of the unencoded video signal; means variously shifting the phases of the said isolated harmonic frequency components; means for variously attenuating the amplitudes of the said isolated harmonic frequency components; and means recombining the resulting variously phase shifted and attenuated harmonic frequency components with the unencoded video signal to degrade the horizontal synchronizing pulse portion thereof and thereby provide the encoded video signal.

21. A communications system according to claim 20, wherein the said array of bandpass means comprises means separately isolating at least the first order, second order, and third order harmonic frequency components of the encoded synchronizing pulse.

22. A communications system according to claim 20, wherein the passband of each of the bandpass means is centered on a frequency which is a whole multiple of 15.75 kilocycles and is on the order of 500 cycles in width.

23. In a video signal wireless transmission system of the type presenting a visual image by a succession of horizontal line scans and successive vertical field scans with a horizontal synchronizing pulse recurring during line retrace intervals and a vertical synchronizing pulse recurring during field retrace intervals, a video signal encoding means comprising: means for generating an unencoded video signal with included synchronization pulses; a parallel array of bandpass means separately isolating several harmoinc frequency components of the video signal including frequency components of a recurrent synchronizing pulse of the unencoded video signal; means variously shifting the phases of the said isolated harmonic frequency components; means for variously attenuating the amplitudes of the said isolated harmonic frequency components; means recombining the resulting variously phase shifted and attenuated harmonic frequency components with the unencoded video signal to degrade the synchronizing pulse portion thereof and thereby provide an encoded video signal; means amplitude modulating a carrier wave with the encoded video signal; and means radiating the modulated carrier wave.

24. In a video signal communications system of the type presenting a line scan type visual image, video signal encoding and decoding circuits comprising: means for generating an unencoded video signal with included synchronizing pulses; means selecting various frequency components of the unencoded video signal including frequency components of a synchronizing pulse thereof; means variously shifting the phases of the said frequency components; means for variously attenuating the amplitudes of the said frequency components; means recombining the resulting variously phase shifted and attenuated harmonic frequency components with the unencoded video signal to provide an encoded video signal; means amplitude modulating a carrier wave with the encoded video signal; means radiating the modulated carrier wave; a receiver for receiving said encoded video signal modulated carrier wave; detection means for the encoded video signal; means decoding the encoded video signal by restoring the said frequency components to substantially their pre-encoded phase and amplitude relationships; and means effecting a synchronizing image presentation of the decoded video signal.

25. In a video signal communications system of the type presenting a visual image by a succession of horizontal line scans and successive vertical field scans with a horizontal synchronizing pulse recurring during line retrace intervals and a vertical synchronizing pulse recurring during field retrace intervals, video signal encoding and decoding circuits comprising: means for generating an unencoded video signal with included synchronization pulses; a parallel array of bandpass means separately isolating several harmonic frequency components of the video signal including frequency components of a recurrent synchronizing pulse of the unencoded video signal; means variously shifting the phases of the said isolated harmonic frequency components; means for variously attenuating the amplitudes of the said isolated harmonic frequency components; means recombining the resulting variously phase shifted and attenuated harmonic frequency components with the unencoded video signal to provide an encoded video signal; means amplitude modulating a carrier wave with the encoded video signal; means radiating the modulated carrier wave; a receiver for receiving said encoded video signal modulated carrier wave; detection means for the encoded video signal; means decoding the encoded video signal by restoring the harmonic frequency components of the said recurrent synchronizing pulse to substantially their pre-encoded phase and amplitude relationships; and means effecting a synchronizing image presentation of the decoded video signal.

26. A communications system according to claim 25, wherein the said array of bandpass means comprises means separately isolating at least the first order, second order, and third order harmonic frequency components of the encoded synchronizing pulse of the video signal.

27. A communications system according to claim 25, wherein the passband of each of the bandpass means is centered on a frequency which is a whole multiple of 15.75 kilocycles and is on the order of 500 cycles in width.

28. In a video signal communications system of the type presenting a line scan type visual image, video signal encoding and decoding circuits comprising: means for generating an unencoded video signal with included synchronizing pulses; means selecting various frequency components of the unencoded video signal including frequency components of a synchronizing pulse thereof; means variously shifting the phase of the said frequency components; means for variously attenuating the amplitudes of the said frequency components; means recombining the resulting variously phase shifted and attenuated harmonic frequency components with the unencoded video signal to provide an encoded video signal; means amplitude modulating a carrier wave with the encoded video signal; means radiating the modulated carrier wave; a receiver for receiving said encoded video signal modulated carrier wave including detection means for the encoded video signal; means decoding the encoded video signal by restoring the said frequency components to substantially their pre-encoded phase and amplitude relationships; and means effecting a synchronized image presentation of the decoded video signal.

29. In a subscription television video receiver presenting a line scan type visual image, a video signal decoding circuit for decoding an encoded video signal wherein degradation of various frequency components of the video signal, including frequency components of a synchronizing pulse thereof, have been variously attenuated and shifted in phase, said decoding circuit comprising: means detecting the encoded video signal; means for variously phase shifting and attenuating said frequency components in a manner substantially restoring their pre-encoded phase and amplitude relationships, thereby developing a decoded video signal; and means employing the decoded video signal to effect a synchronized video image presentation.

30. In a subscription television video receiver presenting a line scan type visual image, a video signal decoding circuit for decoding an encoded video signal wherein various frequency components of the video signal including frequency components of a synchronizing pulse thereof, have been variously attenuated and shifted in phase, said decoding circuit comprising: means detecting the encoded video signal; means selecting the frequency components of the video signal which have been encoded; means deriving phase corrected and amplitude corrected frequency components by variously phase shifting and attenuating the said encoded frequency components so that when said components are recombined with the encoded video signal the encoded frequency components of the resultant video signal have been restored substantially to their pre-encoded phase and amplitude relationships; means combining the thus phase corrected and amplitude corrected frequency components with the unencoded video signal to derive a decoded video signal; and means employing the decoded video signal to effect a synchronized video image presentation.

31. In a subscription television video receiver wherein a line scan type visual image is presented, a video signal decoding circuit for decoding an encoded video signal wherein certain frequency components of the video signal, including frequency components of a synchronizing pulse thereof, have been variously attenuated and shifted in phase, said decoding circuit comprising: means detecting the encoded video signal; means selecting the encoded frequency components thereof; selectively variable means deriving phase corrected and amplitude corrected frequency components therefrom by separately phase shifting and attenuating the said encoded frequency components so that when said components are recombined with the encoded video signal the resultant video signal has all frequency components thereof restored substantially to their pre-encoded phase and amplitude relationships; means combining the thus phase corrected and amplitude corrected frequency components with the unencoded video signal to derive a decoded video signal; and means employing the decoded video signal to effect a synchronized video image presentation.

32. A decoding circuit according to claim 31, wherein said selectively variable means comprises means for individually varying the relative amplitude of any selected frequency component with respect to that of the other frequency components, and means for individually varying the relative phase of any selected frequency component with respect to that of the other frequency components.

33. A decoding circuit according to claim 31, wherein said encoded frequency components selection means and said selectively variable means comprise variable frequency tuned circuits, which by a selected amount of off-center tuning can function to also effect both relative phase shift and relative attenuation of the frequency components.

34. In a video signal communications system of the type presenting a visual image by a succession of horizontal line scans and successive vertical field scans with a horizontal synchronizing pulse recurring during line retrace intervals and a vertical synchronizing pulse recurring during field retrace intervals, video signal encoding and decoding circuits comprising: means for generating an unencoded video signal with included synchronization pulses; a parallel array of bandpass means separately isolating several harmonic frequency components of the video signal, including frequency components of the horizontal synchronizing pulse thereof; means variously shifting the phase of the said isolated harmonic frequency components; means for variously attenuating the amplitudes of the said isolated harmonic frequency components; means recombining the resulting variously phase shifted and attenuated harmonic frequency components with the unencoded video signal to degrade the horizontal synchronizing pulse portion thereof and thereby provide an encoded video signal; means amplitude modulating a carrier wave with the encoded video signal; means radiating the modulated carrier wave; a receiver for receiving said encoded video signal modulated carrier wave; detection means for the encoded video signal; means decoding the encoded video signal by restoring the said harmonic frequency components of the video signal to substantially their pre-encoded phase and amplitude relationships; and means effecting a synchronized image presentation of the decoded video signal.

35. In a subscription television video receiver wherein a visual image is presented by a succession of horizontal line scans and successive vertical field scans with a horizontal synchronizing pulse recurring during line retrace intervals and a vertical synchronizing pulse recurring during field retrace intervals, a decoding circuit decoding an encoded video signal characterized by the degradation of selected frequency components of the video signal, including frequency components of a recurrent synchronizing pulse thereof to the extent that certain of the various frequency components of the recurrent synchronizing pulse have been variously attenuated and shifted in phase, said decoding circuit comprising: means detecting the encoded video signal; bandpass means isolating certain harmonic frequency components of the degraded synchronizing pulse thereof; means for variously phase shifting, attenuating and recombining said components with the encoded video signal in a manner substantially restoring their pre-encoded phase and amplitude relationships, thereby developing a decoded video signal; and means employing the decoded video signal to effect a synchronized video image presentation.

36. In a subscription television video receiver wherein a visual image is presented by a succession of horizontal line scans and successive vertical field scans with a horizontal synchronizing pulse recurring during line retrace intervals and a vertical synchronizing pulse recurring during field retrace intervals, a decoding circuit for decoding an encoded video signal characterized by the degradation of selected frequency components of the video signal, including frequency components of a recurrent synchronizing pulse thereof to the extent that certain of the various frequency components of the recurrent synchronizing pulse have been variously attenuated and shifted in phase, said decoding circuit comprising: means detecting the encoded video signal; bandpass means isolating said harmonic frequency components of the degraded video signal; means deriving phase corrected and amplitude corrected frequency components therefrom by separately phase shifting and attenuating such isolated harmonic frequency components so that when said components are recombined with the encoded video signal the resultant video signal includes the synchronizing pulse with the frequency components thereof restored substantially to their pre-encoded phase and amplitude relationships; means combining the thus phase corrected and amplitude corrected harmonic frequency components with the unencoded video signal to derive a decoded video signal; and means employing the decoded video signal to effect a synchronized video image presentation.

37. In a subscription television video receiver wherein a visual image is presented by a succession of horizontal line scans and successive vertical field scans with a horizontal synchronizing pulse recurring during line retrace intervals and a vertical synchronizing pulse recurring during field retrace intervals, a decoding circuit for decoding an encoded video signal characterized by the degradation of selected frequency components of the video signal, including frequency components of the horizontal synchronizing pulse thereof to the extent that certain of the various frequency components of the recurrent synchronizing pulse have been variously attenuated and shifted in phase, said decoding circuit comprising: means detecting the encoded video signal; bandpass means separately isolating said harmonic frequency components of the degraded video signal; selectively variable means deriving phase corrected and amplitude corrected frequency components therefrom by separately phase shifting and attenuating such isolated harmonic frequency components so that when said components are recombined with the encoded video signal the resultant video signal includes the horizontal synchronizing pulse with the frequency components thereof restored substantially to their pre-encoded phase and amplitude relationships; means combining the thus phase corrected and amplitude corrected harmonic frequency components with the unencoded video signal to derive a decoded video signal; and means employing the decoded video signal to effect a synchronized video image presentation.

38. A decoding circuit according to claim 37, wherein said selectively variable means comprises means for individually varying the relative amplitude of any selected harmonic component with respect to the other harmonic components, and means for individually varying the relative phase of any selected harmonic component with respect to the others.

39. A decoding circuit according to claim 37, wherein said bandpass means and said selectively variable means comprise variable frequency tuned circuits, which by a selected amount of off-center tuning can function to also effect both relative phase shift and relative attenuation of the harmonic frequency components.

References Cited

UNITED STATES PATENTS

| | | | |
|---|---|---|---|
| 1,542,566 | 6/1925 | Mathes | 179—1.5 |
| 1,726,578 | 9/1929 | Nyquist | 179—1.5 |
| 2,266,194 | 12/1941 | Guanella | 178—5.8 |

JOHN W. CALDWELL, *Acting Primary Examiner.*

H. W. BRITTON, *Assistant Examiner.*